United States Patent
Qureshi

(10) Patent No.: US 6,389,556 B1
(45) Date of Patent: May 14, 2002

(54) MECHANISM TO PREVENT DATA LOSS IN CASE OF A POWER FAILURE WHILE A PC IS IN SUSPEND TO RAM STATE

(75) Inventor: Qadeer Ahmad Qureshi, Round Rock, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/234,528

(22) Filed: Jan. 21, 1999

(51) Int. Cl.[7] .............................. G06F 1/32; G06F 11/08
(52) U.S. Cl. .............................. 714/15; 714/6; 713/320; 713/321; 713/323; 713/324; 711/112
(58) Field of Search .................... 714/6, 14, 15, 714/24; 713/320, 300, 310, 321, 323, 330, 340; 711/161, 173, 102, 104, 112

(56) References Cited

U.S. PATENT DOCUMENTS 5,765,001 A * 6/1998 Clark et al.
6,145,068 A * 11/2000 Lewis
6,243,819 B1 * 6/2001 Jung
6,243,831 B1 * 6/2001 Mustafa et al.

OTHER PUBLICATIONS

Intel/Microsoft/Toshiba, "Advanced Configuration and Power Interface Specification", Revision 1.0a, Nov. 19, 1998, particularly sections 9 through 9.3.4.

* cited by examiner

Primary Examiner—Gopal C. Ray
(74) Attorney, Agent, or Firm—Zagorin, O'Brien & Graham, LLP

(57) ABSTRACT

An improved sleep state provides the benefits of low latency wake up for normal situations, but also provides the ability to wake up in the event that system memory is corrupted during the sleep state due to, e.g., a power failure during that sleep state. Before entering the sleep state, the software operating on the computer system saves system state information relating to the computer system into system memory. In addition, the computer system saves that state information and an image of system memory to non-volatile memory such as a disk drive. At that point power is removed from most of the computer system but power is maintained to the system memory. In response to a wake-up event, the computer system determines if the contents of the system memory has been corrupted. If the contents of the system memory is valid, the state information in the system memory is used to restore the computer system. If however, the contents of the system memory is not valid, the state information and system memory image saved in the non-volatile memory is used to restore the computer system.

20 Claims, 3 Drawing Sheets

MECHANISM TO PREVENT DATA LOSS IN CASE OF A POWER FAILURE WHILE A PC IS IN SUSPEND TO RAM STATE

BACKGROUND OF THE INVENTION

1. Field of the Invention

This invention relates to power management in computer systems and more particularly to entry and recovery from sleep states.

2. Description of the Related Art

One goal of the personal computer industry is to provide personal computers (PCs) that act like any other home appliance. In other words, the PC should function in a predictable and reliable fashion, just like other home appliances. A typical mindset is to expect VCR-like behavior from a PC. When a VCR is switched off and is later turned on, the VCR typically starts playing video from the same spot at which it was stopped. If power is removed from a VCR that is "off", and power is applied back later, the behavior of the VCR does not change.

One approach to managing power in computer systems is described in the Advanced Configuration and Power Interface (ACPI) Specification (revision 1.0a dated Nov. 19, 1998), which is incorporated herein by reference. The ACPI specification identifies multiple system power states for PCs. In particular, the ACPI specification identifies multiple sleeping states that have varying power requirements and can have varying wake-up latencies. One of the states (S3), also called suspend to RAM (STR), allows the system to enter a low power state but resume activity without any information being lost. Once activity is resumed, after the recovery latency, the user sees the system as if it never entered the low power state. In order to accomplish that, system state information, such as all the system configuration data (e.g., chipset configuration information) is saved into system memory, thus saving the "system context." Once that is done, power to most of the system components (except system memory), is turned off, resulting in a significant reduction in the system power consumption. In the S3 state power to the central processing unit (CPU) and most other system components (e.g., the display) is turned off. Those devices that can "wake-up" the system, e.g. the mouse and its interface, the modem and its interface, are supplied sufficient power to be able to alert the system to a wake-up event.

When a PC system is not being used, it is customary, after a period of inactivity, to put the computer system in the S3 state so that system power consumption can be reduced. While in the S3 state, the PC appears to be off to the end user, meaning that no lights are on, and fans are not working. When a wake-up event occurs, e.g., when modem activity is detected, a keyboard key is pressed, or mouse movement is detected, the system context is restored using the system configuration data in system memory and the user sees the PC in exactly the same state in which the PC was in before it entered the S3 state. The wake up latency to transition from S3→S0 (the operating state) of five seconds is considered acceptable when the PC is turned "on". However, if there is a power failure, or if the PC is unplugged from the wall socket while in the S3 state, all state information that was being stored in system memory is lost, and the system needs to reboot when power is reapplied. That type of behavior is not desirable to the average user.

Another system sleep state (S4), also called suspend to disk (STD), allows all of the system configuration data and an image of system memory to be saved to a non-volatile medium such as a hard disk. That sleep state allows system power to be removed from the entire system (including the system memory), resulting in lower power consumption than that in the S3 state. When the system needs to wake up, the system state information is restored from the system disk. The wake up sequence from S4 typically takes a much longer time compared to wake up from S3, because of the relative large disk access time.

The problem of data volatility in system memory can be addressed by always placing the system in the suspend to disk (S4) state. However, that results in unacceptably long wake up times that would be undesirable to the average user. It would be desirable to address to problem of data volatility without always paying the penalty of long wake up latencies.

SUMMARY OF THE INVENTION

Accordingly, an improved sleep state has been discovered that provides the benefits of low latency wake up for normal situations, but also provides the ability to wake up in the event that system memory is corrupted during the sleep state due to, e.g., a power failure during that sleep state. Before entering the sleep state, the software operating on the computer system saves system state information relating to the computer system into system memory. In addition, the computer system saves that state information and an image of system memory to non-volatile memory such as a disk drive. The computer system may set a flag in a non-volatile memory location indicating that the computer system is in a special sleep state. At that point power is removed from most of the computer system but power is maintained to the system memory under normal conditions. In response to a wake-up event, the computer system determines if the contents of the system memory have been corrupted. If the contents of the system memory is valid, the state information in the system memory is used to restore the computer system. If however, the contents of the system memory is not valid, the state information and system memory image saved in the non-volatile memory is used to restore the computer system.

BRIEF DESCRIPTION OF THE DRAWINGS

The present invention may be better understood, and its numerous objects, features, and advantages made apparent to those skilled in the art by referencing the accompanying drawings.

DESCRIPTION OF THE PREFERRED EMBODIMENT(S)

Figure 1:
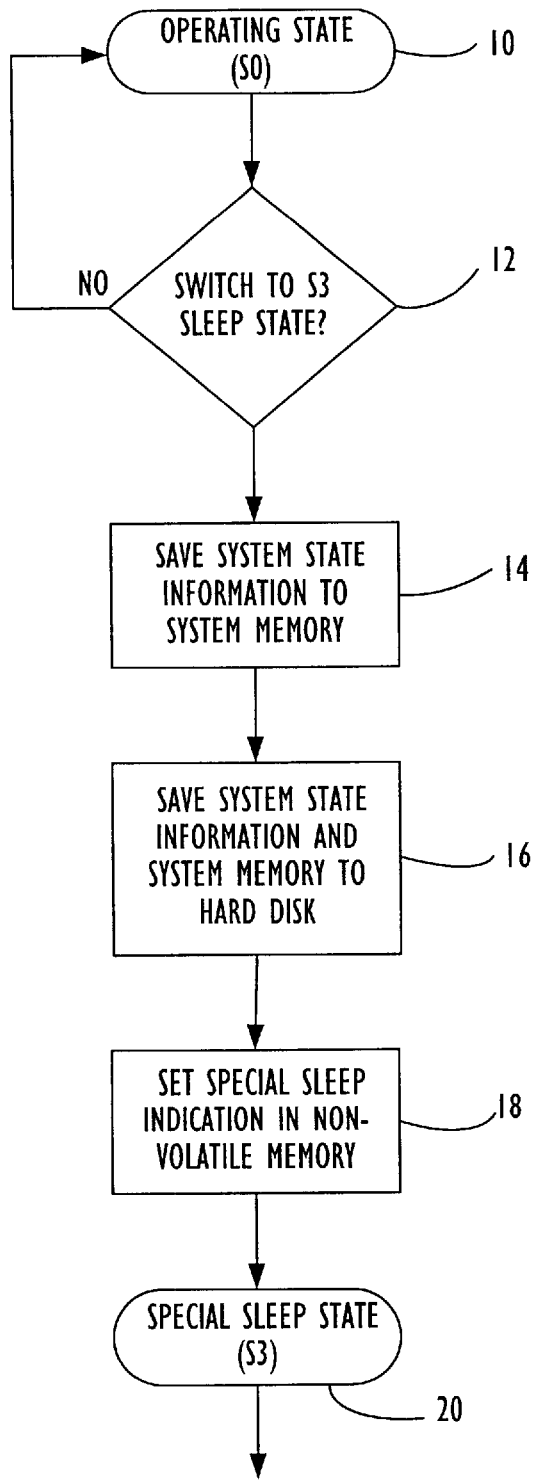
FIG. 1 illustrates a flow chart of a computer system entering the special S3 sleep state according to one embodiment of the present invention.

In order to prevent loss of configuration data in case power is lost when the system is in S3 state additional safeguards are taken to prevent loss of system state data in the form of an improved special sleep state. Referring to FIG. 1, the system starts in the operating or S0 state 10. When the system determines in step 12 that the conditions are appropriate to switch to the S3 sleep state due to a predetermined time period of inactivity, then power management software saves the system state (e.g. chipset configuration data) to system memory in step 14. In addition, in step 16, the system state information and an image of the contents of the system memory is written to the system disk as if the system was transitioned to S4. The image should include at least those portions of the system memory that were being used by the computer and may include the entire contents of the system memory. The image of the system memory is required in order to be able to restore the system to exactly the same state the PC was in when it entered the S3 state.

In addition, in step 18, power management software operating on the computer system sets an indication in a non-volatile memory location, such as the non-volatile memory associated with the real time clock (RTC), to indicate that the system is in the special sleep state. That indication may be accomplished by asserting a bit or bits to a predetermined value, e.g., setting the LSB of a memory location to one. Note that providing the indication of the special sleep state may be unnecessary when, e.g., the special sleep state is always used in place of the currently defined suspend to RAM sleep state. Power is then removed to most of the system (except to the system memory). In this state, the CPU stops executing instructions and the system appears off to the user. The system is now in the special S3 sleep state 20 that provides the advantages of S3 sleep state in terms of typical wake up latency but also provides additional capability in case power is removed from the system during the sleep state.

Figure 2:
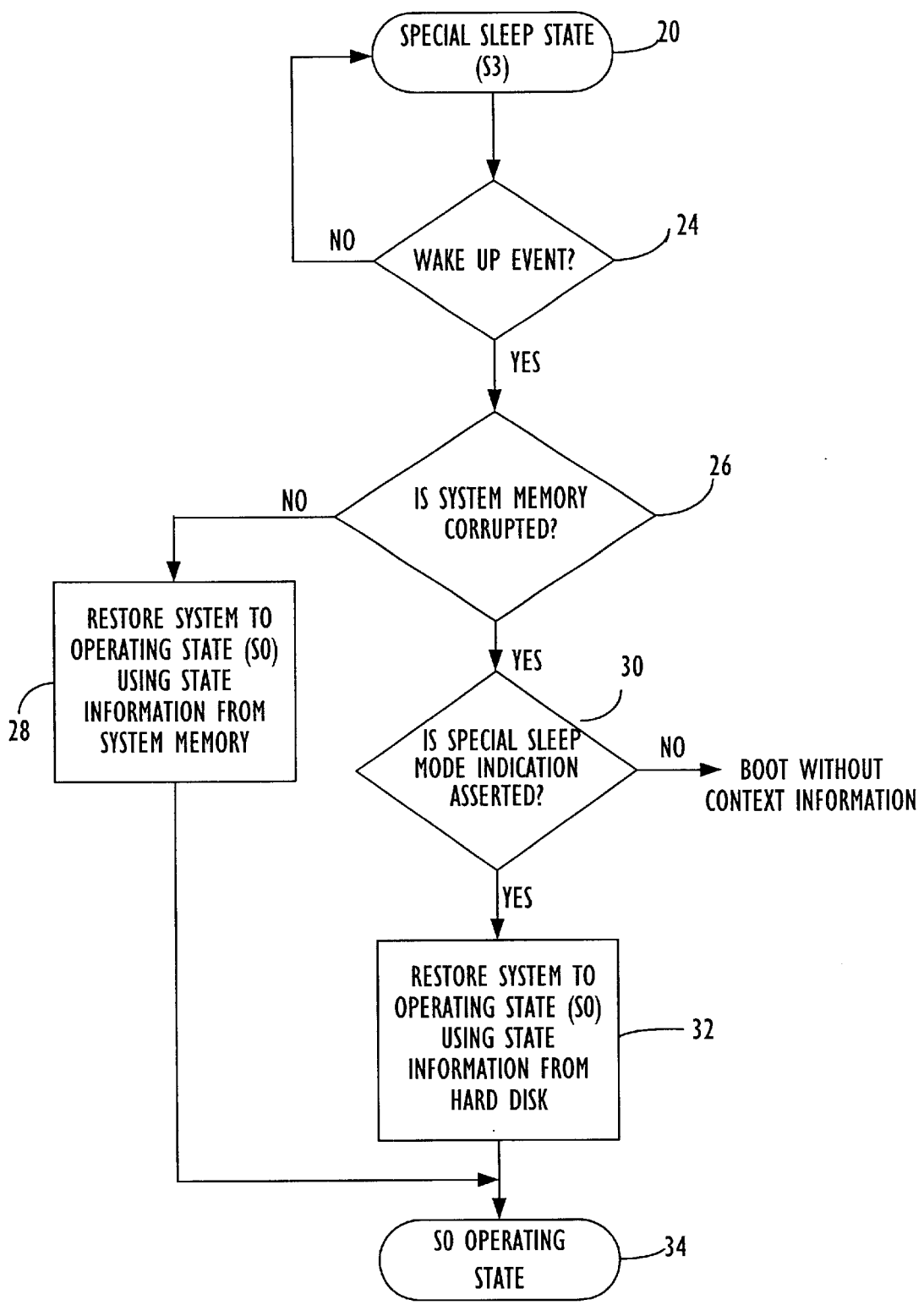
FIG. 2 illustrates a flow chart of a computer system waking up from the special S3 sleep state according to one embodiment of the present invention.

Referring to FIG. 2, the system remains in the special S3 sleep state 20 waiting for a wake up event, to transition back to the S0 (working state) in which the processor is executing instructions. When a wake up event is detected in 24, the power management software determines in step 26 whether or not the system memory has been corrupted while in the S3 sleep state. The determination of whether the memory has been corrupted can be accomplished by storing a predetermined string at a known location in system memory. That location can be checked to determine if still contains the predetermined string and if it does not, the assumption may be made that the system memory has been corrupted. If the location does contain the string, it may be assumed that the contents of the system memory have not been corrupted. Alternatively, a circuit can be used to actually detect power loss and to provide an indication (e.g. to set a flag) indicating that there was a power loss, which would indicate that system memory is corrupted. If the contents of the system memory are valid, the power management software restores the system to the S0 operating state with a latency of approximately five seconds. Note that the five second latency is exemplary and other latencies are within the scope of this invention.

If the power management software (or hardware) determines that the contents of the system memory has been corrupted, e.g., because of a power loss in step 26, if the special sleep mode indication is used, the power management software checks to see if the special sleep mode indication is set in step 30. If the special sleep mode indication is used but not asserted, then the system has to reboot as if it was in an off state because the state information required to restore the system to its previous operating state has been lost. In that case, the computer system is unable to restore itself to the state it was in prior to entering the S3 sleep state.

However, if the special sleep flag is set, or if the system is assumed to utilize the special sleep state, that means that the state information has been saved (along with the system memory image) and is stored in a non-volatile memory such as the system hard disk. Note that any non-volatile memory that is capable of storing both the state information and the system memory image may be used. The computer system then restores the system to its operating state in 32 in a manner analogous to restoring a computer system from the S4 state. Note that the latency to restore the system state from the non-volatile memory is significantly longer than the latency to restore the system state from system memory. However, it is better to be able to restore the system to the state that it was in before entering the S3 state, even if it takes longer than otherwise desirable for an S3→S0 transition, than to lose all state information and have to reboot without the system state. In that way, a more secure sleep state is provided.

Although, the ACPI specification does not specify latency requirements such that there is a specified amount of time to transition from S3→S0 there are other factors that impose latency restrictions such the need to capture caller ID information for an incoming call and to meet user expectations for minimized latency. Thus, restoring the system in step 28 from system memory may take approximately five seconds to meet desired latency. However, there are no time restrictions on how long the system should take to enter the S3 state from the S0 state, and thus it is permissible to save system state information both to system memory and to hard disk in the S0→S3 transition and comply with the ACPI specification and other constraints.

Figure 3:
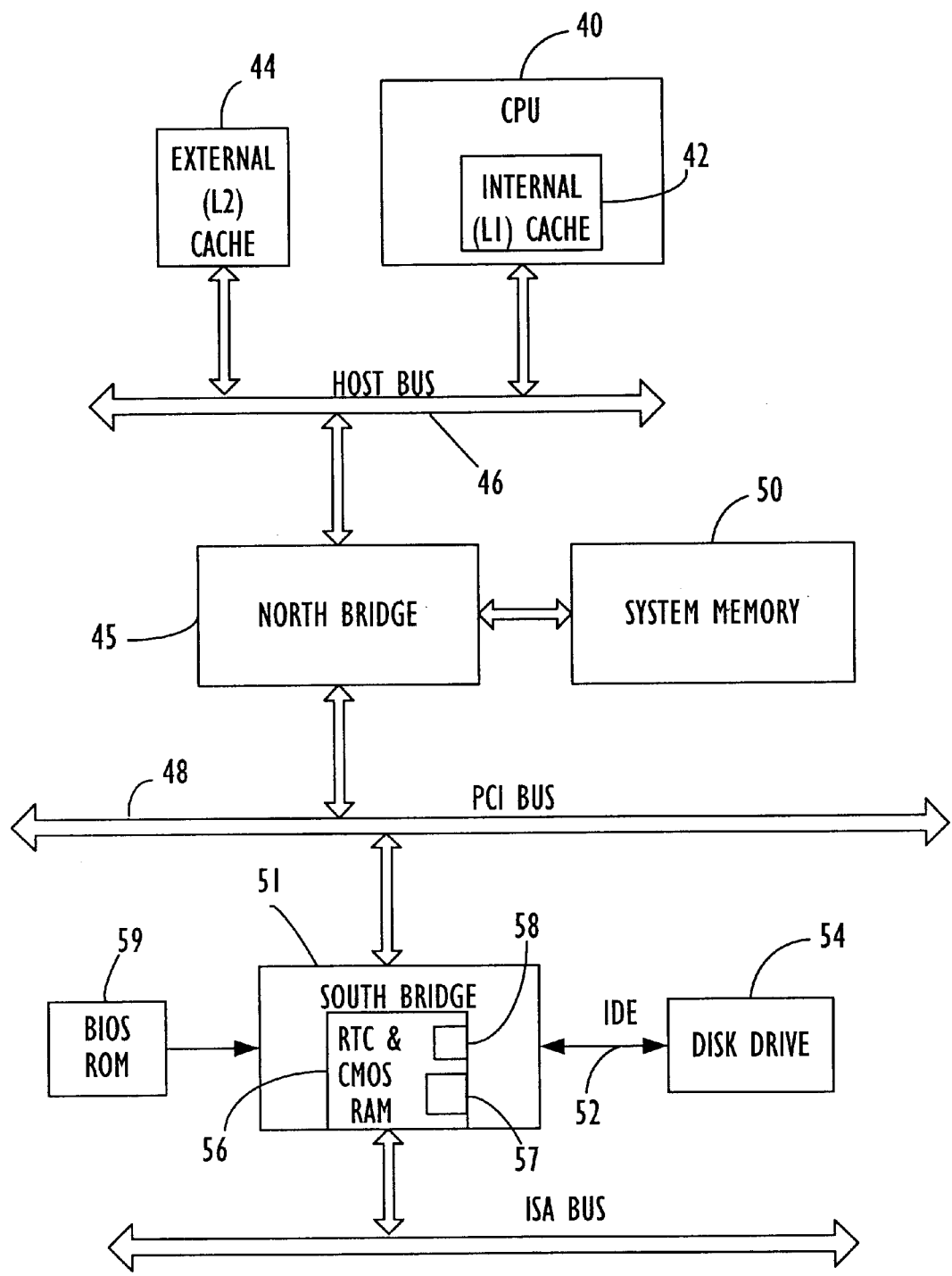
FIG. 3 illustrates an exemplary computer system that implements the present invention.

Referring to FIG. 3, an exemplary computer system implementing the invention described herein is illustrated. CPU 40 (such as an AMD K6™ or Intel Pentium II processor) may include an internal (or L1) cache 42 as well as an external or L2 cache 44. The CPU and external cache are coupled to a north bridge integrated circuit 45 through host bus 46. The north bridge provides a bridge function between the host bus and PCI bus 48. In addition, north bridge 45 provides a memory control function to Interface to system memory 50. The south bridge 51 provides a bridge function between the PCI bus and other system interfaces such as IDE 52 which couples to disk drive 54. The south bridge also Includes the Real Time Clock and CMOS RAM 56 which provides the non-volatile memory for storing the special sleep flag 58. The power loss detection circuit 57 may also reside in the Real Time Clock and the CMOS RAM 56 and/or may set its associated flag (not shown) in a location in the Real Time Clock and CMOS RAM 56 to indicate that power loss has occurred. The power loss detection circuit may also reside elsewhere in south bridge or elsewhere in the computer system as long as it is able to detect the power loss and provide an indication that is assertable in the event of a power loss.

When the system is in special sleep mode, flag 58 in CMOS RAM is asserted (if used) and the system state information is stored in system memory 50. In addition, the system state information and the appropriate image of the system memory is stored in disk drive 54. The system wakes up from the S3 sleep state using the system state information in the system memory 50 (if not corrupted) or the disk drive 54. From either the S3 or S4 sleep state, the CPU is initialized to a reset vector. The reset vector directs control to BIOS routines located in BIOS ROM 59 which determine the wakeup method by checking the signature (or the power loss flag). Once the wakeup method is determined, control is switched to the appropriate restore routine. Note that part of the restore may reside in BIOS, although presently, restore is typically mostly under operating system control. The power management software routines related to determining the appropriate wakeup method is presently contemplated as residing in BIOS and being operating system transparent although it is well within the scope of the invention to incorporate such functionality into the operating system power management software in whole or in part.

The description of the invention set forth herein is illustrative, and is not intended to limit the scope of the invention as set forth in the following claims. For example, while the non-volatile memory area associated with the real time clock was described as being used for storing the special sleep state flag, any non-volatile memory area accessible to the system may also be used. Further, the computer system described is exemplary and the invention does not require any particular processor or bus or bridge integrated circuits. In addition, while a hard disk was described as storing the system state information and system memory image, other non-volatile memory such as writable CDs, tape, and floppy disks may also be used to store system state information and the system memory image. Other variations and modifications of the embodiments disclosed herein, may be made based on the description set forth herein, without departing from the scope and spirit of the invention as set forth in the following claims.

What is claimed is:

1. A method of transitioning a computer system between an on state and a sleep state, comprising:

saving state information relating to the computer system into system memory in preparation to enter the sleep state;

saving the state information and an image of at least a portion of the system memory to non-volatile memory in preparation to enter the sleep state;

entering the sleep state;

in response to a wake-up event, determining if contents of the system memory have been corrupted;

if the contents of the system memory have not been corrupted, using the state information in the system memory to restore the computer system; and if the contents of the system memory have been corrupted, using the state information and the image of the system memory saved in the non-volatile memory to restore the computer system.

2. The method as recited in claim 1 further comprising providing a special sleep indication in a non-volatile memory location indicating that the computer system is in the sleep state, the special sleep indication indicating that state information has been saved in system memory and non-volatile memory.

3. The method as recited in claim 2, wherein the non-volatile memory location indicating that the system is in the sleep state is memory associated with the real time clock.

4. The method as recited in claim 2 wherein upon the wake-up event, the method further comprises determining if the special sleep indication in the non-volatile memory location is set, prior to using the state information saved in the non-volatile memory to restore the computer system.

5. The method as recited in claim 1, wherein the non-volatile memory is a hard disk.

6. The method as recited in claim 1 wherein the computer system is restored using the state information in the system memory within a first latency and wherein the computer system is restored using the state information saved in the non-volatile memory to restore the computer system within a second latency, the second latency being longer than the first latency.

7. A method of transitioning a computer system including a central processing unit (CPU) between power states, comprising:

saving state information of the computer system into a first memory area;

saving the state information into a second memory area;

saving at least a portion of contents of the first memory area into the second memory area;

entering a sleep state in which the CPU in the computer system is not executing instructions;

upon a wake-up event, restoring the computer system within a first latency using the state information in the first memory area; and upon the wake-up event, restoring the computer system within a second latency using the state information from the second memory area if the state information in the first memory area is corrupted.

8. The method as recited in claim 7 wherein the first memory area is system memory that requires power to be provided during the sleep state.

9. The method as recited in claim 7 wherein the second memory area is a system disk.

10. The method as recited in claim 7 wherein the first latency is approximately five seconds.

11. The method as recited in claim 7 wherein the second latency is greater than approximately five seconds.

12. A computer system capable of entering a reduced power state, comprising:

a processor;

system memory coupled to the processor, the system memory being supplied power in the reduced power state;

a first non-volatile memory storing state information in the reduced power state; and software operable on the processor, responsive to a wakeup event to restore state information relating to the computer system from the system memory and operable to restore state information from the first non-volatile memory responsive to an indication that the system memory has been corrupted.

13. The computer system as recited in claim 12 further comprising a second non-volatile memory including a memory location storing an indication of the reduced power state.

14. The computer system as recited in claim 13 wherein the second non-volatile memory storing the indication of the reduced power state is CMOS RAM memory associated with a real time clock.

15. The computer system as recited in claim 12 wherein the first non-volatile memory is a hard disk.

16. The computer system as recited in claim 12 wherein the indication that the system memory has been corrupted is determined according to a comparison of a predetermined memory location in system memory to a predetermined value.

17. The computer system as recited in claim 12 wherein the computer system further comprises a power loss detection circuit and the indication that the system memory has been corrupted is determined according to an indication provided from the power loss detection circuit.

18. Software encoded on computer readable media, the software operable on a processor in a computer system, the software operable to:

save state information relating to the computer system into system memory prior to entering a sleep state;

save the state information and an image of at least a portion of the contents of the system memory to non-volatile memory prior to entering the sleep state;

cause the computer system to enter the sleep state;
determine if contents of the. system memory have been corrupted in response to a wake-up event;
use the state information in the system memory to restore the computer system, if the contents of the system memory have not been corrupted; and
if the contents of the system memory have been corrupted, use the state information and the image of the system memory saved in the non-volatile memory to restore the computer system.

19. The software encoded on computer readable media as recited in claim 18 wherein the computer readable media comprises non-volatile memory storing BIOS software and storing at least a portion of the software.

20. The software encoded on computer readable media as recited in claim 18 wherein the computer readable media comprises non-volatile memory storing operating system software, and storing at least a portion of the software.

* * * * *